United States Patent
Deephanphongs

(10) Patent No.: US 9,317,966 B1
(45) Date of Patent: Apr. 19, 2016

(54) DETERMINE HEIGHTS/SHAPES OF BUILDINGS FROM IMAGES WITH SPECIFIC TYPES OF METADATA

(75) Inventor: David Deephanphongs, San Francisco, CA (US)

(73) Assignee: Google Inc., Mountain View, CA (US)

( * ) Notice: Subject to any disclaimer, the term of this patent is extended or adjusted under 35 U.S.C. 154(b) by 718 days.

(21) Appl. No.: 13/396,819

(22) Filed: Feb. 15, 2012

(51) Int. Cl.
*G06K 9/00* (2006.01)
*G06T 17/00* (2006.01)
*G06T 17/05* (2011.01)
*H04N 13/02* (2006.01)

(52) U.S. Cl.
CPC ............... *G06T 17/00* (2013.01); *G06T 17/05* (2013.01); *H04N 13/02* (2013.01)

(58) Field of Classification Search
None
See application file for complete search history.

(56) References Cited

U.S. PATENT DOCUMENTS

| | | | | |
|---|---|---|---|---|
| 5,467,444 | A * | 11/1995 | Kawamura et al. ............ | 345/441 |
| 5,745,751 | A * | 4/1998 | Nelson .................. | G06T 11/206 706/919 |
| 6,654,690 | B2 * | 11/2003 | Rahmes .................. | G06T 17/05 702/5 |
| 7,133,551 | B2 * | 11/2006 | Chen ....................... | G01C 11/04 345/419 |
| 7,515,153 | B2 * | 4/2009 | Jin et al. .......................... | 345/440 |
| 7,752,018 | B2 * | 7/2010 | Rahmes et al. .................... | 703/2 |
| 8,401,222 | B2 * | 3/2013 | Thornberry ......... | G06K 9/00637 382/100 |
| 8,433,457 | B2 * | 4/2013 | Garceau .................. | G06T 7/001 700/1 |
| 8,823,723 | B2 * | 9/2014 | Katsukura ............. | G06F 9/4443 345/581 |
| 2003/0184545 | A1 * | 10/2003 | Ohto ............................. | 345/419 |
| 2004/0041805 | A1 * | 3/2004 | Hayano et al. ................ | 345/419 |
| 2005/0203768 | A1 * | 9/2005 | Florance ................ | G06Q 50/16 701/438 |
| 2006/0061566 | A1 * | 3/2006 | Verma et al. .................... | 345/419 |
| 2006/0176213 | A1 * | 8/2006 | Rahmes ................. | G01C 11/00 342/140 |
| 2007/0033126 | A1 * | 2/2007 | Cagan .................... | G06Q 40/00 705/35 |
| 2007/0141977 | A1 * | 6/2007 | O'Hanlon .............. | G06Q 30/02 455/3.01 |
| 2007/0258623 | A1 * | 11/2007 | McGrath ............. | G06F 17/3087 382/104 |
| 2008/0262789 | A1 * | 10/2008 | Pershing ................ | G06Q 10/00 702/156 |
| 2009/0089018 | A1 * | 4/2009 | Kelley et al. ...................... | 703/1 |
| 2009/0109216 | A1 * | 4/2009 | Uetabira ................. | G06T 17/05 345/419 |
| 2009/0304227 | A1 * | 12/2009 | Kennedy et al. .............. | 382/100 |
| 2011/0033110 | A1 * | 2/2011 | Shimamura ........... | G01C 11/06 382/173 |
| 2011/0055091 | A1 * | 3/2011 | Budlong ................ | G06Q 10/00 705/313 |
| 2011/0169947 | A1 * | 7/2011 | Gum .................... | G06F 17/3087 348/135 |
| 2013/0060540 | A1 * | 3/2013 | Frahm et al. ...................... | 703/2 |
| 2013/0155109 | A1 * | 6/2013 | Schultz ................. | G06T 11/003 345/634 |
| 2014/0125667 | A1 * | 5/2014 | Praun et al. .................... | 345/423 |

FOREIGN PATENT DOCUMENTS

JP 06348815 * 12/1994 ............. G06F 15/62

OTHER PUBLICATIONS

Building model reconstruction—photographs, Ruijin Ma, The Ohio state university, 2004, Pages.*

(Continued)

*Primary Examiner* — Jayesh A Patel
(74) *Attorney, Agent, or Firm* — Dority & Manning, P.A.

(57) ABSTRACT

Embodiments combine at least two photographic images of a building as well as camera parameters associated with the images with information about the legal boundaries of a lot associated with the building in order to construct a three-dimensional model of the building.

15 Claims, 8 Drawing Sheets

(56) References Cited

OTHER PUBLICATIONS

Building model reconstruction—photographs, Ruijin Ma, The Ohio state university, 2004, pp. 1-181.*

"Geocoding", http://en/wikipedia.org/wiki/Geocoding, last modified Nov. 27, 2011, downloaded Nov. 28, 2011, pp. 1-6.

"Photogrammetry", http://en.wikipedia.org/wiki/Photogrammetry, last modified Nov. 16, 2011, downloaded Nov. 28, 2011, pp. 1-4.

"Reverse geocoding", http://en.wikipedia.org/wiki/Reverse_geocoding, lats modified Jun. 20, 2011, downloaded Nov. 28, 2011, pp. 1-2.

"Photo Tourism: Exploring Photo Collections in 3D—Microsoft Research", http://research.microsoft.com/en-us/um/redmond/groups/ivm/phototours/, last modified Aug. 20, 2008, downloaded Sep. 8, 2011, pp. 1-3.

"Photogrammetry", http://en.wikipedia.org/wiki/Photgrammetry, last modified Oct. 14, 2011, downloaded Oct. 27, 2011, pp. 1-4.

"LIDAR", http://en.wikipedia.org/wiki/LIDAR, last modified Oct. 11, 2011, downloaded Oct. 27, 2011, pp. 1-10.

* cited by examiner

DETERMINE HEIGHTS/SHAPES OF BUILDINGS FROM IMAGES WITH SPECIFIC TYPES OF METADATA

BACKGROUND

1. Field of the Invention

This field is generally related to the use of lot boundary information in conjunction with constructing a simulated three-dimensional (3D) environment.

2. Related Art

Three-dimensional modeling tools and other computer-aided design (CAD) tools enable users to define three-dimensional models, such as a three-dimensional model of a building. Photographic images of the building may be available from, for example, satellite, aerial, vehicle-mounted street-view and user cameras. For example, a set of such photographs may be stored in a database. By combining photographs of the building and information associated with the photographs with photogrammetry algorithms, it becomes possible to use multiple photographs to create a visually appealing three-dimensional model.

Photographic images alone may not provide sufficient information to successfully construct an accurate three-dimensional model. However, there are other sources of data about buildings that are available, once the identity of the building has been established. For example, a governmental entity may store information about the boundaries of a lot upon which a building is situated.

BRIEF SUMMARY

Embodiments relate to using building lot information to create a three-dimensional model of a building.

In embodiments, a computer-implemented method, system, and computer-readable storage medium are provided for constructing a three-dimensional model of a building using a plurality of two-dimensional photographic images in an image database and a building lot database. In embodiments, a first photographic image of the building from the image database is identified. The first photographic image is taken from a first perspective specified by a first set of camera parameters. A second photographic image of the building from the image database is identified. The second photographic image is taken from a second perspective specified by a second set of camera parameters, such that the second perspective is different from the first perspective. A first feature in the first photographic image corresponding to at least a portion of a roof of the building is determined. A second feature in the second photographic image corresponding to at least a portion of the roof of the building is determined. A height of the building is determined based on the positions of first and second features within the first and second images respectively, and the first and second sets of camera parameters. Legal boundaries that define a lot associated with the building in the building lot database are identified. A three-dimensional model of the building is determined by combining the height and the legal boundaries of the lot. The legal boundaries specify, at least in part, a perimeter of the model and the height of the building specifies, at least in part, a height of the model.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Using a pre-existing database of photographic images and associated metadata, embodiments may find two or more photographic images that are views of the same building from different location. For example, the first view could be directly in front of the building, the second view may be from the next nearest available camera position. Additionally, information from a building-lot database may be combined with metadata, which may provide information about camera parameters associated with photographic images. The photographic images and the metadata may be combined with the building lot information to generate a three-dimensional model of a building (or a region containing multiple buildings) by applying computer graphics techniques (such as photogrammetry). One such approach is to treat the two views as a single binocular image.

Embodiments also take maximum advantage of the information provided in addition to the images. One type of information of this sort that has been discussed is building lot information. However, many other types of information may be incorporated into the modeling process. For example, one embodiment may use information from remote sensing, such as RADAR, LIDAR, or SONAR (which may provide information about the shape of a building). It may also be noted that not all of the views need not be photographic images taken at street level. Indeed, one or more of the views may include overhead photographic images of a building, such a photographic image taken from a helicopter, plane or satellite.

Thus, embodiments present a new way to model buildings based on two-dimensional images that incorporate additional information to improve the quality of the model.

Figure 1:
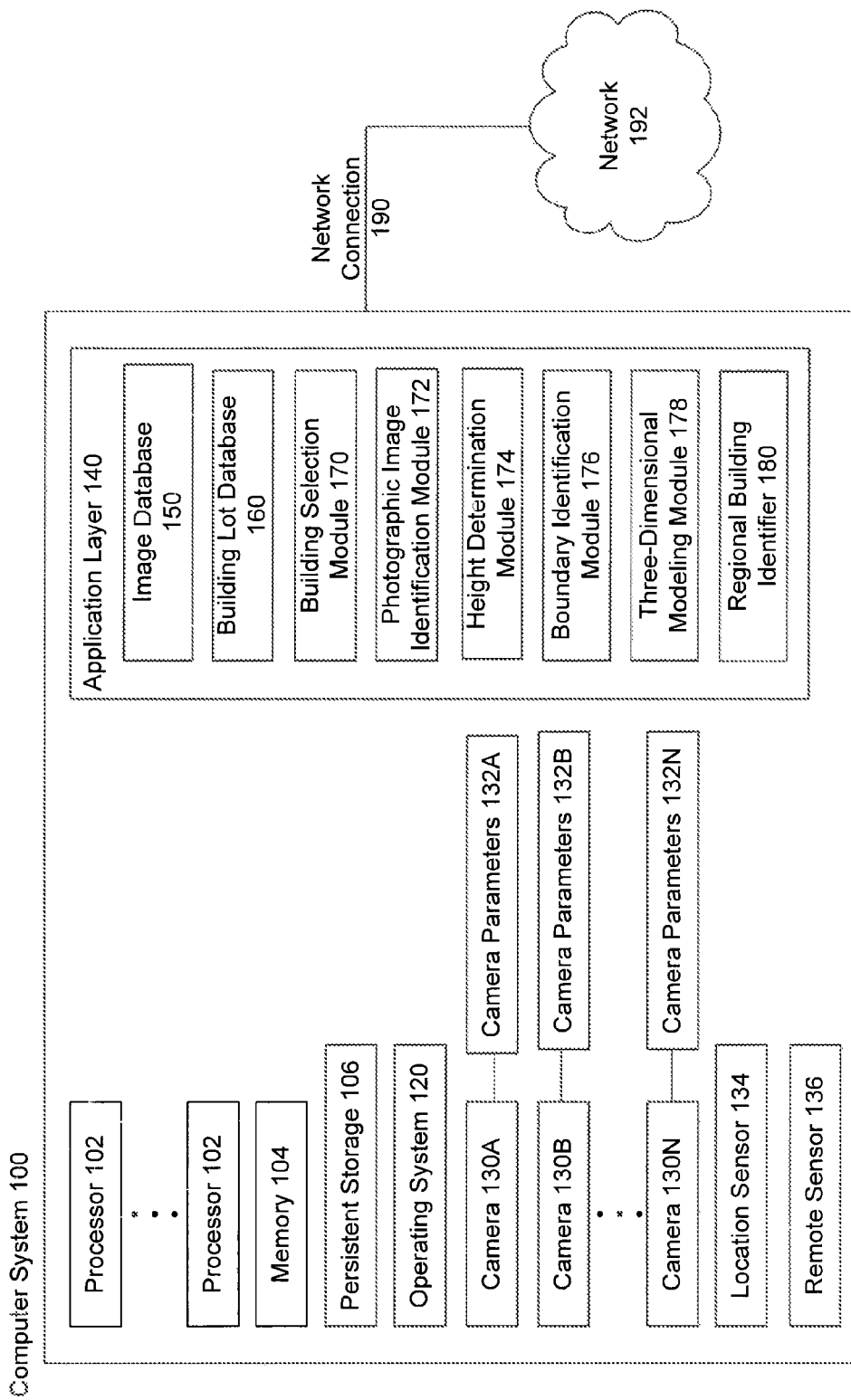
FIG. 1 is a diagram illustrating an exemplary system, according to an embodiment.

FIG. 1 is a diagram illustrating an exemplary system, according to an embodiment. In embodiments, a system is a computer system 100 that processes information to generate a three-dimensional model of a building.

Computer system 100, in general, will be an electronic device with one or more processors 102, a memory 104, a persistent storage 106, and an operating system 120. Additionally, computer system 100 may include various input sources. For example computer system 100 may include one or more cameras 130A, 130B . . . 130N, each of which may be associated with corresponding camera parameters 132A, 132B . . . 132N. Computer system 100 may also include other sources of information, such as a location sensor 134 (such as a GPS) or remote sensor 136 (which may incorporate information from sources such as RADAR, LIDAR, or SONAR, as discussed above).

Each of the constituent parts of a system embodiment may be implemented on any computer system 100. Such computer system 100 can include, but is not limited to, a personal computer, mobile device such as a mobile phone, workstation, embedded system, game console, television, set-top box, or any other computer system 100. Further, computer system 100 can include, but is not limited to, a device having a processor and memory for executing and storing instructions. Software may include one or more applications and an operating system. Hardware can include, but is not limited to, a processor, memory and graphical user interface display. Computer system 100 may also have multiple processors and multiple shared or separate memory components. For example, computer system 100 may be a clustered computing environment or server farm.

Each of the constituent parts of a system embodiment may be implemented in hardware, software, firmware, or any combination thereof. Likewise, modules or instructions that constitute operative parts of embodiments may utilize any type of structured memory, including a persistent memory. In examples, each data storage infrastructure may be implemented as a relational database.

Computer system 100 runs an operating system 120 that coordinates the relationship between the software and hardware components of the mobile device. A system bus (not shown) may interconnect the various hardware components of computer system 100. Alternatively, any hardware infrastructure that allows the various components of computer system 100 to communicate with each other may be used in embodiments in lieu of a system bus.

While these various features of computer system 100 have been set forth so as to characterize computer system 100 and provide for different hardware aspects of various exemplary system embodiments, it is to be noted that embodiments need not incorporate all of these features and some may clearly be implemented in a variety of ways. For example, persistent storage may be implemented as a hard drive in some embodiments, flash memory in other embodiments, or may not be present in other embodiments.

In one embodiment, computer system 100 may include subsystems such as cameras 130A, 130B . . . 130N, location sensor 134, and remote sensor 136. Such a computer system 100 may use these subsystems to help gather information for the modeling process. However, there may be no need for cameras 130A, 130B . . . 130N, location sensor 134, or remote sensor 136 in another embodiment, which may be an embodiment in which image database 150 has been prepopulated with relevant images (and their associated camera parameters). In general, system embodiments may omit components that have been discussed, or include additional equivalent components as needed to implement various features.

System embodiments may process information at an application layer 140 that runs on computer system 100. For example, application layer 140 may include subsystems such as an image database 150, a building lot database 160, a building selection module 170, a photographic image identification module 172, a height determination module 174, a boundary identification module 176, a three-dimensional modeling module 178, and a regional building identifier 180. As discussed above embodiments need not incorporate all of these features and some may clearly be implemented in a variety of ways.

Image database 150 stores a variety of the photographic images of a building or region that is to be modeled. As discussed, there should be at least two photographs in image database 150 that store different views of the building or region that is to be modeled. In addition, image database 150 should also store information about the camera parameters associated with the images that it stores. Such camera parameters may include, for example, information which may include the physical location, position, field of view, level of zoom, focus settings, etc., that were the settings of the camera that took each image in image database 150. Such information provides context for the images involved in the modeling process. This camera parameter information allows the images to be processed in a manner that provides initial information about what the images that are to be processed are depicting.

Building lot database 160 stores information about the legal boundaries of physical lots associated with buildings. Such a database may be provided by various entities, such as a governmental entity. However, building lot database may certainly be maintained and provided by other parties as well. As will be discussed subsequently, building lot database 160 should include information such that when a specific building is identified (such as by name, address, or latitude/longitude), building lot database 160 is able to provide sufficient information to establish the legal boundaries of the lot that corresponds to the building. For example, building lot database may store information about corners of the lot, edges of the lot, or dimensions of the lot. The building lot database may also have zoning information, such as regulations regarding building setbacks.

While in general embodiments work best with rectangular lots in which a rectangular building on the lot covers the entire lot, other embodiments may provide functionality in cases where the lot or the building is not rectangular, and/or the building does not cover the entire lot. Additionally, embodiments are designed to model buildings that have flat roofs, and additional modeling techniques may be necessary if this is not the case.

The actual operation of a system embodiment may begin at building selection module 170. Building selection module 170 offers a variety of ways to establish how to model a building. In one embodiment, a user may identify a building (such as by name, address, or latitude/longitude). Depending on how the building is identified, it may be necessary to use geocoding or reverse geocoding to allow computer system 100 to ascertain which building is to be modeled. An alternative approach is to establish a region that is to be modeled, and to perform the modeling process for each of the buildings in the region.

The next subsystem is photographic image identification module 172. The role of photographic image identification module 172 is to determine at least two photographic images from image database 150 that can be used to create a three-dimensional model of the selected building. In general, the images must be different views. For example, the images may be chosen so that they are binocular views of the same building and may be combined using photogrammetry to create the three-dimensional model.

Figure 4:
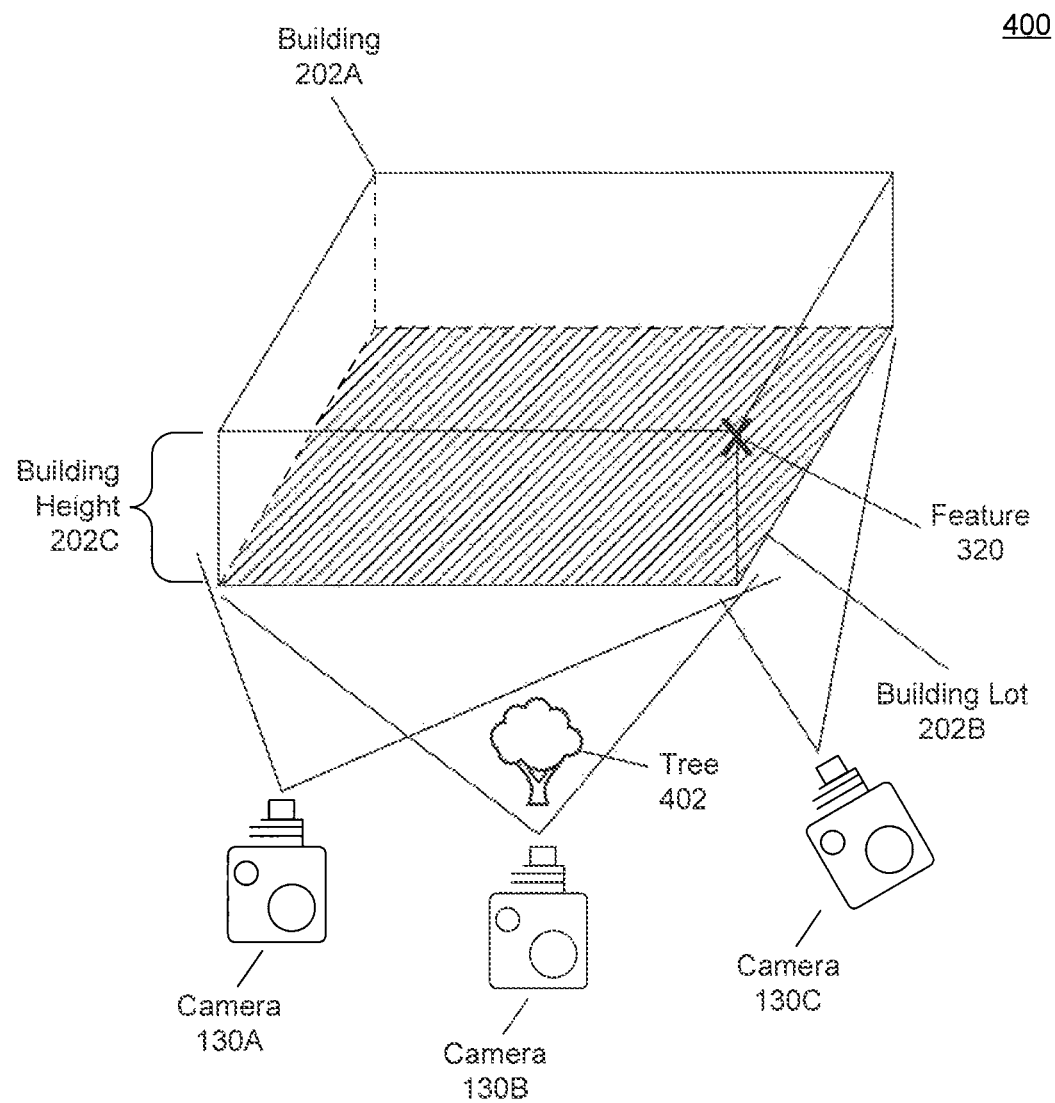
FIG. 4 is a diagram of how three cameras may acquire photographic images to be used in the modeling process, if the view of one camera is occluded, according to an embodiment.

Additionally, it is possible to use more than two images. For example, a third photographic image of the building from the image database may be identified, the third photographic image taken from a third perspective specified by a third set of camera parameters, wherein the third photographic image is chosen from the image database with a third perspective that provides a perspective of a part of the building that is obstructed in at least one of the first photographic image and second photographic image. Thereafter, the three-dimensional model may be improved based on information provided by the third image and the third set of camera parameters by modeling aspects of the building that are obstructed in the first photographic image and second photographic image. An example of how this occurs is illustrated in FIG. 4, which is discussed below.

After photographic image identification module 172 chooses the relevant images, height determination module 174 determines a height of the building being modeled. For example, if there are two images, a first feature corresponding to a portion of the roof may be identified in the first image, and a second feature corresponding to a portion of the roof may be identified in the second image. In an embodiment, the first and second features may correspond to the same portion of the roof of the building, but it is still possible to perform analysis to determine the height of the building in which different portions of the roof are identified where camera parameter information helps to establish the height of the building being modeled. An example of how building heights are determined is provided in FIGS. 3A-3C.

Another subsystem of computer system 100 is boundary identification module 176. In order to function, boundary identification module 176 accesses building lot database 160 based on identifying information for the building being modeled. As discussed, such information may be obtained by explicitly determining a name, address, or location of the building. In one embodiment, if the only information available for a building is the relevant images, the camera parameters associated with the images can be used to infer the geographical location of the building, and techniques such as reverse geocoding can be used as necessary in order to establish a name or address for the building. As discussed, once the building is identified its lot record may be retrieved from boundary identification module 176. The lot record, as discussed, establishes legal boundaries for the lot associated with the building, and may include information such as corners of the lot, edges of the lot, or dimensions of the lot, which establish a two-dimensional area that represents the lot upon which the building is situated.

Finally, computer system 100 includes a three-dimensional modeling module 178. This subsystem incorporates all of the information discussed previously, including at least two photographic images with associated camera parameters, height information determined from the images and parameters, lot information, and any other information (such as information provided by remote sensor 136). While the operation of three-dimensional modeling module 178 will be illustrated further below, three-dimensional modeling module 178 begin with existing techniques in which images multiple views of buildings are used to create a three-dimensional model of the building. However, three-dimensional modeling module 178 improves upon existing techniques in that by using additional information such as lot boundaries, it is possible to verify and otherwise improve the accuracy of three-dimensional modeling module 178 in a way that allows constructions of three-dimensional models that may be more representative of what is being modeled than existing techniques which do not incorporate such information. Building lot information provides an optimized approach, since approximate three-dimensional models can be created by determining the height of only one feature, plus the pre-existing lot boundary information.

An optional subsystem of computer system 100 is a regional building identifier 180. Regional building identifier 180 is configured to identify a plurality of buildings in a physical region. Then, the plurality of buildings identified by regional building identifier 180 may each be processed by the other subsystems, as previously discussed, so that computer system 100 is configured to construct a three-dimensional model of the buildings in the physical region.

Each of the constituent parts of computer system 100 may be implemented in hardware, software, firmware, or any combination thereof. Furthermore, each of the information storage parts of computer system 100 may be stored in any type of structured memory, including a persistent memory. In examples, such a persistent memory may be implemented as a database, including a relational database.

Computer system 100 may use network connection 190 to communicate with other processing machines via network 192. Network connection 190 may be a wired connection such as Ethernet, token ring, or optical, DSL, cable, or phone connection in conjunction with an appropriate modem. Similarly, appropriate wireless technology may be used to act as network connection 190 to access network 192. Network 192 may be the Internet, a local area network, or any other network 192 of machines with which computer system 100 may exchange data.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Computer-readable medium embodiments may include any physical medium which is capable of encoding instructions that may subsequently by used by a processor to implement methods described herein. Example physical media may include floppy discs, optical discs (e.g. CDs, mini-CDs, DVDs, HD-DVD, Blu-ray), hard drives, punch cards, tape drives, flash memory, and memory chips. However, any other type of tangible, persistent storage that can serve in the role of providing instructions to a processor may be used to store the instructions in these embodiments.

Figure 2:
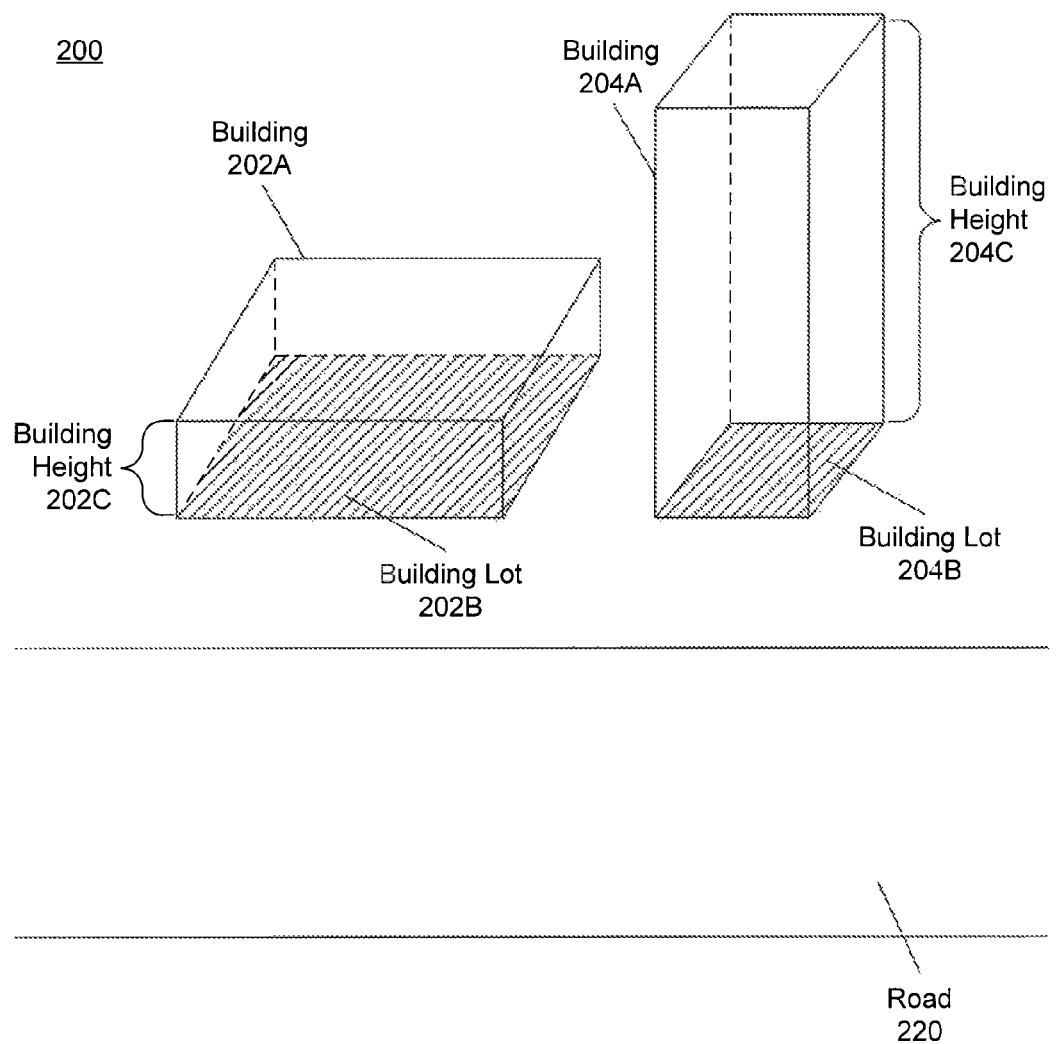
FIG. 2 is a diagram of example buildings that may be modeled, according to an embodiment.

FIG. 2 is a diagram of example buildings that may be modeled, according to an embodiment. For example, diagram 200 portrays two buildings: buildings 202A and 204A. These buildings correspond to building lots 202B and 204B and building heights 202C and 204C. These buildings are portrayed as being situated on opposite sides of road 220. The goal of FIG. 2 is to illustrate issues that arise in the modeling process. As can be seen, building lots 202B and 204B correspond with the two-dimensional "footprints" of buildings 202A and 204A. As illustrated, each of the buildings may occupy its entire lot. This situation, in which the building occupies the entire lot, is the preferred scenario as it is easy to use the building lot to create the model. Alternatively, setback information may be used.

Figure 3A:
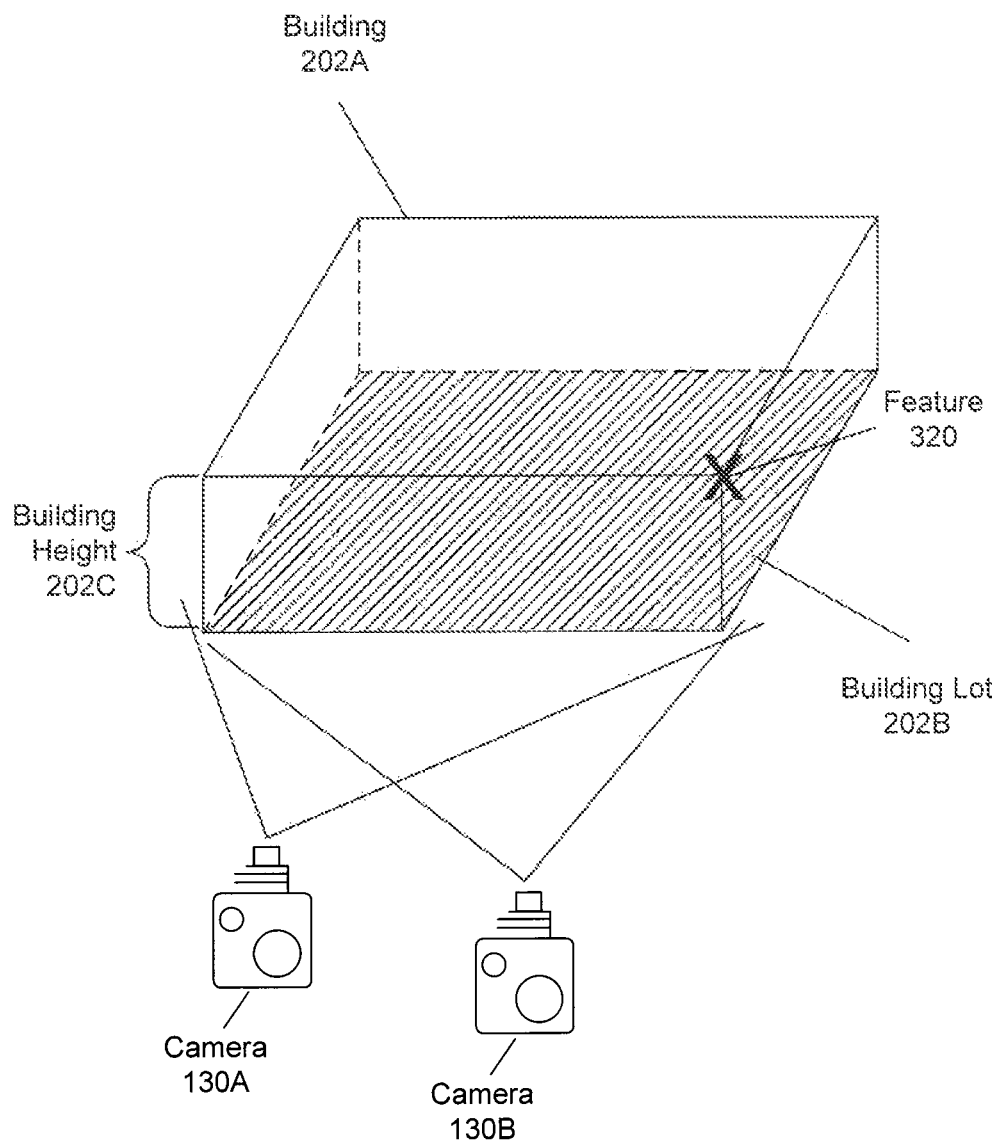
FIG. 3A is a diagram of how two cameras may acquire photographic images to be used in the modeling process, according to an embodiment.

FIG. 3A is a diagram of how two cameras may acquire photographic images to be used in the modeling process, according to an embodiment. In FIG. 3A, two cameras 130A and 130B each take photographic images of a designated building 202A. As previously discussed with respect to FIG. 2, building 202A is associated with building lot 202B and building height 202C. Also as previously discussed, cameras 130A and 130B record camera parameters 132A and 132B when they obtain images of building 202A. It may also be noted that FIG. 3A contains a marked feature 320, which will be used subsequently to help establish a height of building 202A. Feature 320 should correspond to a portion of the roof of building 202A. It may be noted that there may be a different feature 320 in different images, as discussed below.

Figure 3B:
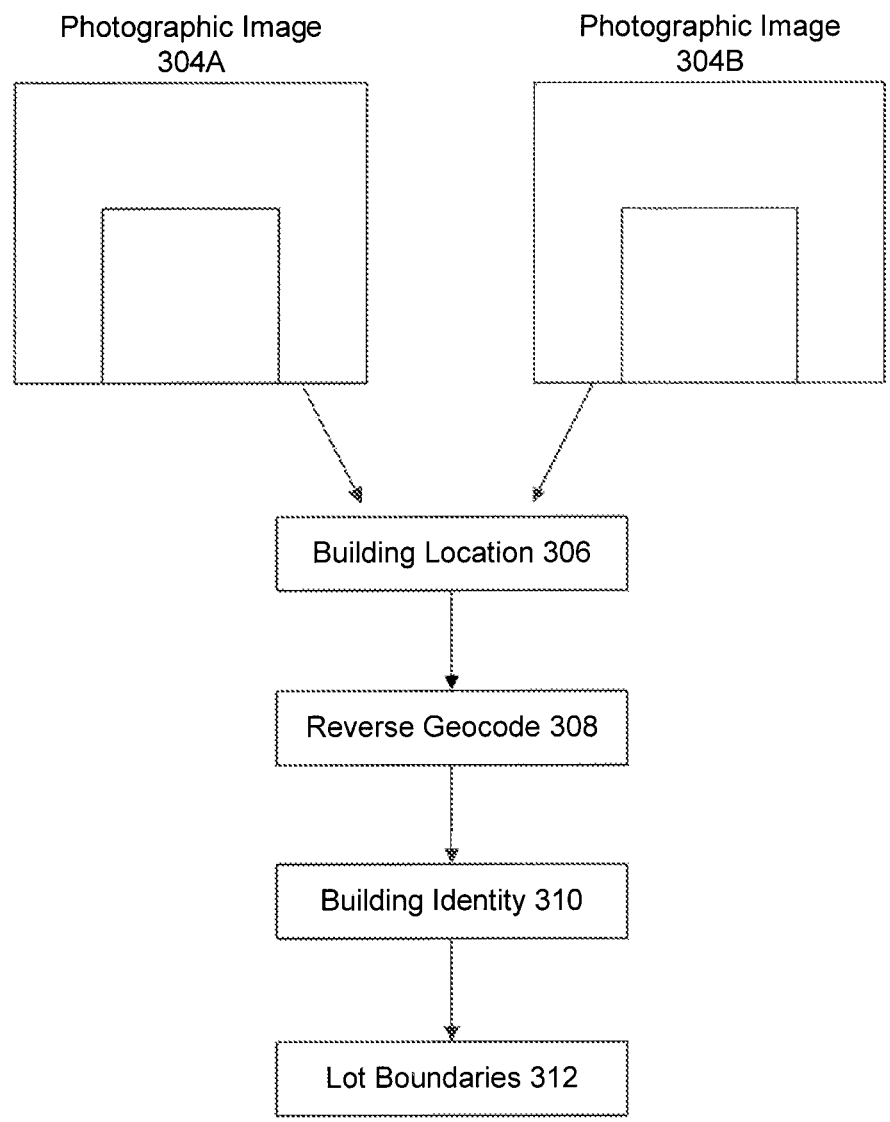
FIG. 3B is a diagram that shows how photographic images of a building may be used to determine lot boundaries, according to an embodiment.

FIG. 3B is a diagram that shows how photographic images of a building may be used to determine lot boundaries, according to an embodiment. FIG. 3B begins with photographic images 304A and 304B. As noted, there may be more than two photographic images, but two photographic images will generally be sufficient. Photographic images 304A and 304B may be obtained by use of cameras 130A and 130B, or they may be chosen appropriately from image database 150 by photographic identification module 172. If the building has already been identified (such as being specified by a user), the operation of FIG. 3B is not necessary. However, one embodiment may operate in a manner that uses selected images without knowing the identity of the building. In this case, photographic images 304A and 304B (as well as their associated camera parameters) may be analyzed to determine a building location 306.

While 304A and 304B illustrate a case where it is very clear which building is the building in question, it may occur that it is not clear that any building is depicted, or that multiple buildings may be candidates for modeling. If no building appears to be available, one embodiment may generate an error message and/or attempt to gain information from another source (such as a user) that may help to establish which building is to be modeled. If multiple buildings are candidates, once again one embodiment may generate an error message and/or attempt to gain information from another source (such as a user) that may help to establish which building is to be modeled.

After ascertaining the building location 306, the building location 306 may be the subject of a reverse geocode operation 308, that identifies a location that corresponds with where the photographic images were taken and what the subject of the photographic images was. Based on the reverse geocode 308, a building identity 310 is established. As discussed, this may be a building name, street address, etc. However, the reverse geocode 308 and building identity 310 are not mandatory. The ultimate goal is to determine lot boundaries 312, which may be performed by using building location 306 or building identity 310 to establish lot boundaries 312 by referencing building lot database 160. The lot boundaries may subsequently be used to model the building.

Figure 3C:
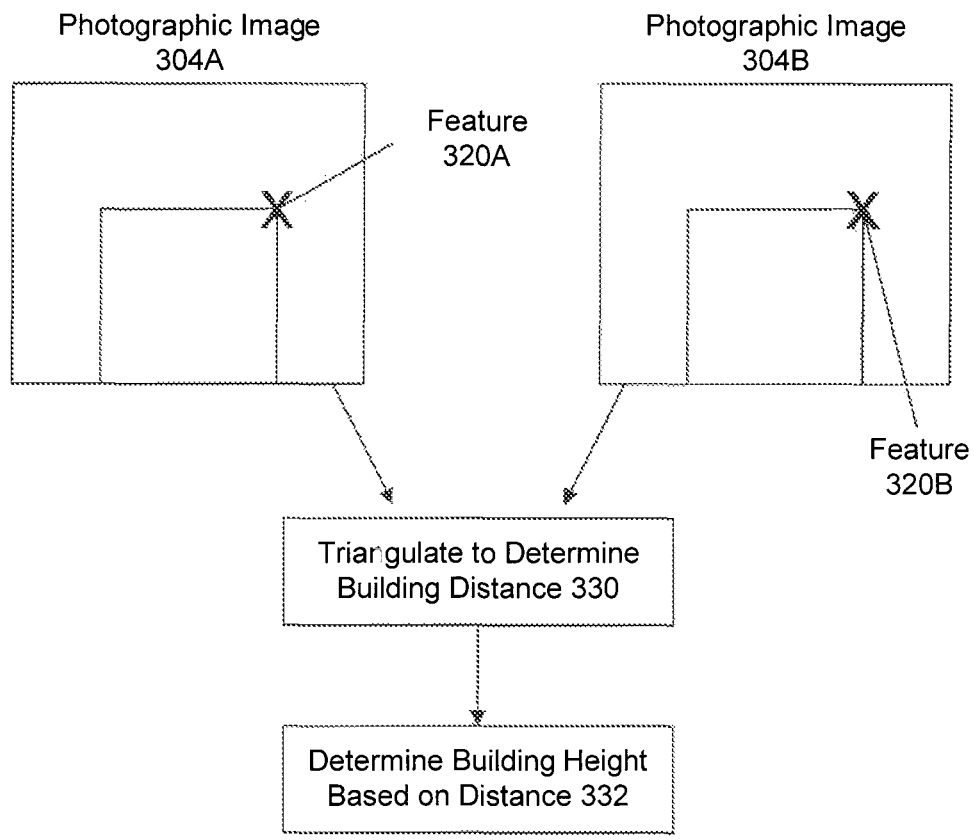
FIG. 3C is a diagram that shows how photographic images of a building may be used to determine building height, according to an embodiment.

FIG. 3C is a diagram that shows how photographic images of a building may be used to determine building height, according to an embodiment. FIG. 3C shows photographic images 304A and 304B, as previously illustrated in FIG. 3B. However, photographic image 304A now includes feature 320A, and photographic image 304B now includes feature 320B. The feature, as noted before, is chosen to represent a portion of the roof of building 202A. While FIG. 3C illustrates a case where photographic images 304A and 304B are similar and the feature illustrates essentially the same portion of the roof (i.e., a specific corner), other embodiments need not include the exact same feature, so long as it is possible to identify features in photographic images 304A and 304B where the features each refer to a portion of the roof. It may be noted that if building 202A does not have a flat roof, it may be necessary to incorporate more information or model the building as multiple separate subbuildings. It may be possible to establish that a given feature is part of the roof of building 202A using graphical techniques such as edge detection.

Based on photographic images 304A and 304B as shown with features 320A and 320B, an embodiment may triangulate to determine building distance 330. It then becomes possible to determine building height based on distance 332. The way in which this goal is achieved is as follows. Assume that photographic images 304A and 304B were obtained from cameras 130A and 130B, positioned as in FIG. 3A. Based on the associated camera parameters, the location, orientation, and other relevant information for cameras 130A and 130B are known. Since feature 320A and 320B are both located on the roof of building 202A and the roof of building 202A is assumed to be flat, the physical height at which features 320A and 320B are located is also known. Thus, it is possible to use photographic images 304A and 304B, the two-dimensional locations of features 320A and 320B, the camera parameters, and the fact that features 320A and 320B are known to be at the same height, in combination with appropriate geometric and mathematical techniques, to establish the building height 202C of building 202A. This building height 202C may be incorporated into the modeling process.

FIG. 4 is a diagram of how three cameras may acquire photographic images to be used in the modeling process, if the view of one camera is occluded, according to an embodiment. As can be seen in FIG. 4, cameras 130A and 130B are placed in a manner that is quite similar to their placement in FIG. 3A. However, now tree 402 is located in between camera 130B and feature 320, blocking the ability of camera 130B to provide a clear view of feature 320. Hence, a desirable option is to incorporate a third photographic image, such as that taken by camera 130C. While it is not as physically proximate to camera 130A as camera 130B, camera 130C has a much clearer view of feature 320 than does camera 130C. Thus, incorporating a photographic image taken by camera 130C into the analysis provided for in FIG. 3C can provide better results for the geometric analysis that uses the photographic images to determine building height 202C.

Overview of the Method

Figure 5:
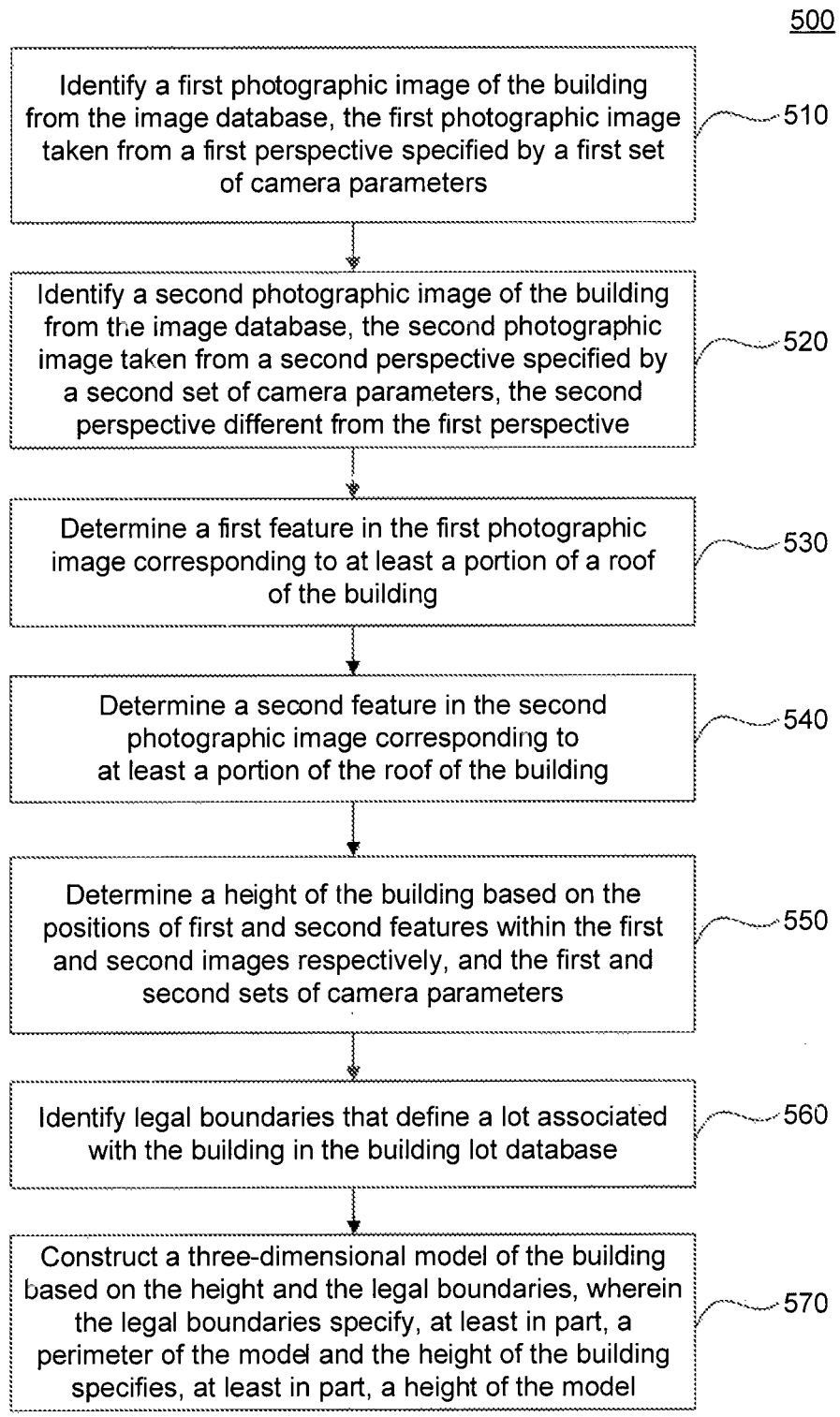
FIG. 5 is a flowchart of the method of one embodiment.

FIG. 5 is a flowchart of the method of one embodiment.

In stage 510, a first photographic image of the building from the image database is identified, such that the first photographic image is taken from a first perspective specified by a first set of camera parameters. For example, the first photographic image may be obtained at the time of use by a camera such as camera 130A with its associated camera parameters 132A. Alternatively, the first photographic image may be an image stored in image database 150. As discussed previously, the camera parameters may encompass information such as the position and orientation of the camera, as well as settings such as zoom and field of view. It may be noted that while one embodiment carries out the method based on the assumption that the building has already been identified, another embodiment selects photographs, and uses the camera locations and reverse geocoding as discussed in connection with FIG. 3B to establish the identity and/or location of the building.

In stage 520, a second photographic image of the building from the image database is identified, such that the second photographic image is taken from a second perspective specified by a second set of camera parameters, the second perspective different from the first perspective. The second photographic image is obtained in a manner analogous to the way in which the first photographic image was obtained. As noted, the second photographic image needs to be taken from a second perspective that is different from the first perspective, as otherwise it is not possible to triangulate to establish the building height subsequently.

In stage 530, a first feature in the first photographic image corresponding to at least a portion of a roof of the building is determined. For example, height determination module 174 performs this step by analyzing the first photographic image. As discussed previously, a variety of techniques may be used to identify the feature, such as feature 320A. However, in general image processing using techniques such as edge detection may be used in combination with the first camera parameters to establish a first feature in the first photographic image that corresponds to at least a portion of a roof of the building.

In stage 540, a second feature in the second photographic image corresponding to at least a portion of the roof of the building is determined. For example, stage 540 is carried out in a manner that is analogous to stage 530, identifying a feature such as feature 320B. As noted previously, in one embodiment the second feature may correspond to the same portion of the roof as the first feature. However, this is not required, and the two features may correspond to different portions of the building's roof so long as the building has a roof of a constant height (i.e., a flat roof).

In stage 550, a height of the building is determined based on the positions of first and second features within the first and second images respectively, and the first and second sets of camera parameters. For example, height determination module 174 may accomplish this task by using mathematical and geometric techniques to analyze the first and second images based on the location of the first and second features within the images, and further incorporate information from the first and second sets of camera parameters. Essentially, stage 550 involves photogrammetry that can identify a height of the building based on this information. Even though the first and second images are two-dimensional, given the identified features and the camera parameters, it is possible to combine the information to calculate a height of the building.

In stage 560, legal boundaries that define a lot associated with the building in the building lot database are identified. As discussed, by this stage the identity and/or location of the building has been established, or may now be established by analyzing the images and/or using reverse geocoding. The identity and/or location information may be used by boundary identification module 176 in order to reference into building lot database 160 to ascertain the legal boundaries of the relevant lot.

In stage 570, a three-dimensional model of the building is constructed based on the height and the legal boundaries, wherein the legal boundaries specify, at least in part, a perimeter of the model and the height of the building specifies, at least in part, a height of the model. As discussed, this modeling process may be carried out by three-dimensional modeling module 178. The height information has been determined at stage 550, and the legal boundaries have been established at stage 560. With this information, it is possible to construct a model that consists of a rectangular solid that occupies the legal boundaries, with the determined height. As noted previously, if the building to be modeled is not a rectangular solid that occupies the full lot, it will be necessary to incorporate such information into the operation of three-dimensional modeling module 178 in order to provide a more accurate model. The data flow in the modeling process is discussed in greater depth with respect to FIG. 6.

It may be noted that the above stages delineate an advantageous way to use information such as photographic images, associated camera parameters, and lot information to construct a three-dimensional model of a single building. However, an embodiment may also operate such that the method described above may be repeated for a plurality of buildings, such as a plurality of building in a physical region. For example, as discussed above, it may be possible to identify a plurality of buildings in a physical region (for example, the identification may be performed by regional building identifier 180). An embodiment may identify such a plurality of buildings and repeat the above stages for each of the plurality of buildings in the physical region, such that the method constructs a three-dimensional model of the buildings in the physical region.

The computer-implemented method offers an improvement over prior approaches to 3D modeling. Because it can incorporate lot information as well as other sources of information into constructing models of buildings, the models are more accurate as the lot information serves as a way to verify models constructed solely from photographs. Another advantage of the method is that it can help automate the modeling process and make it easier to construct models with less user involvement. While current approaches often rely heavily on users to provide information when constructing virtual models, the automated approach provided herein offers a way to take advantage of existing images and location information that allows modeling to occur automatically or largely automatically once a building is selected. As discussed above, an embodiment may even be able to model whole regions automatically. Another embodiment can model a building automatically based solely on selecting photos and reverse geocoding, which automates the process of selecting the building as well.

Constructing the Model

Figure 6:
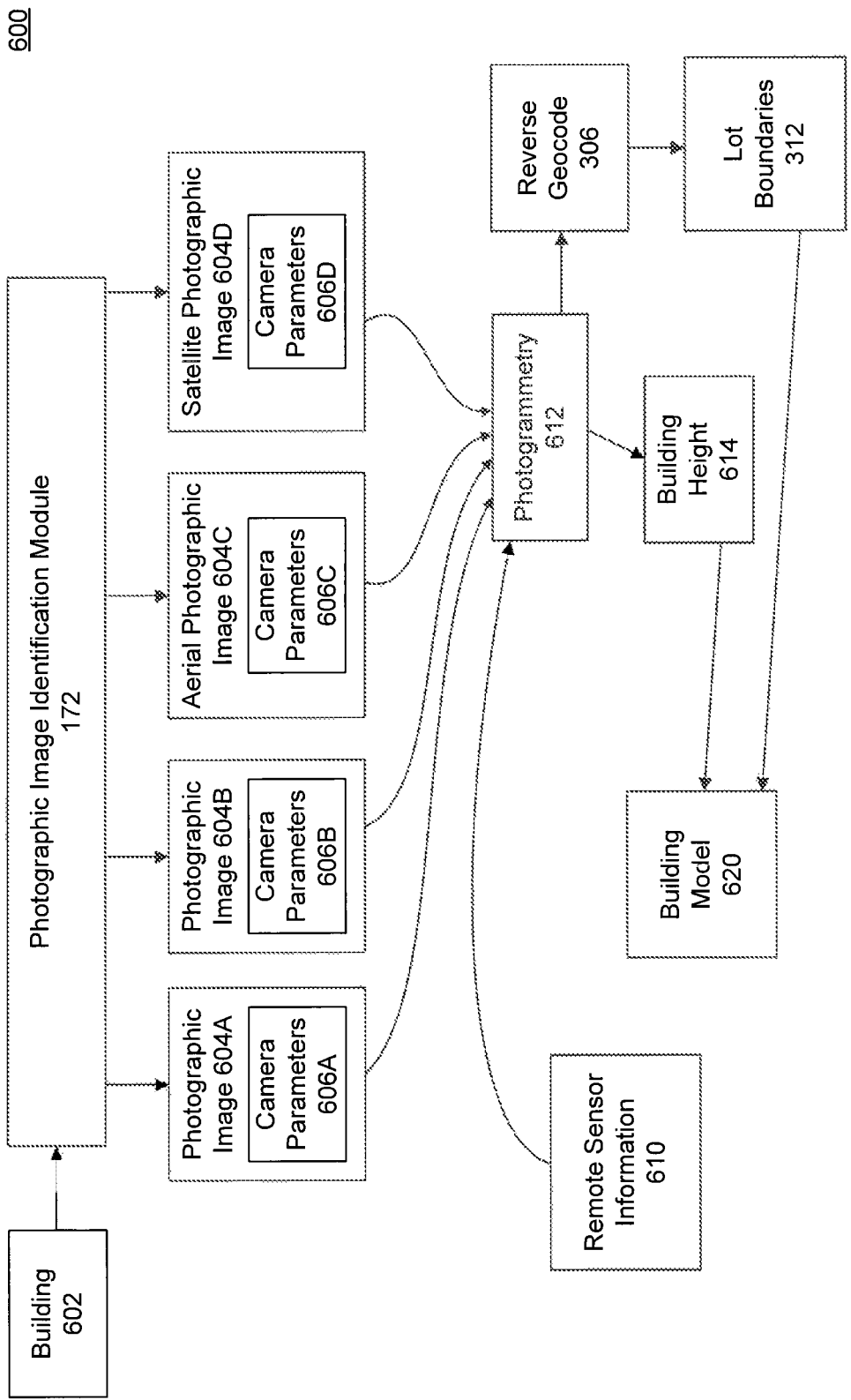
FIG. 6 is a diagram of information flow through an embodiment that illustrates how sources of information are combined to construct a building model.

FIG. 6 is a diagram of information flow through an embodiment that illustrates how sources of information are combined to construct a building model.

FIG. 6 begins with building 602. Building 602 represents a building that has been identified as discussed above. For example, a user may enter an address, name, or location of a building, or other information sufficient to identify a building. This identifying information for building 602 is sent to photographic image identification module 172. Photographic image identification module 172, as discussed, may identify a variety of photographic images that may be used to help build the model. For example, photographic image identification module 172 may identify photographic image 604A (with camera parameters 606A), photographic image 604B (with camera parameters 606B), aerial photographic image 604C (with camera parameters 606C), and satellite photographic image 604D (with camera parameters 606D). It may be noted that this is simply an example set of photographic images; as previously noted two photographic images may be sufficient and overhead photographic images (such as aerial photographic image 604C and satellite photographic image 604D) are optional. These photographic images, 604A-D are provided to the photogrammetry 612.

In another embodiment, the identify of building 602 may be unknown, and the starting point of the embodiment is the generation and/or selection of photographic images with camera parameters that allow the embodiment to deduce which building 602 is to be modeled.

As part of photogrammetry 612, information is passed from photographic images 604A-D for an optional reverse geocode stage 306. The reverse geocode stage 306 is discussed above in connection with FIG. 3B, and it may or may not be relevant based on what information is available with reference to building 602. After the reverse geocode 312, the results with respect to building 602 may be used to determine lot boundaries 312.

The lot boundaries 312 and the building height 314 (which is determined by photogrammetry 612 as discussed above) are then used to create a building model 620 by three-dimensional modeling module 178. As part of the photogrammetry 612, remote sensor information 610 from remote sensor 136 (if present) may be incorporated to further improve the quality of building model 620.

Thus, embodiments represent an effective way of facilitating easy, accurate, and automated approaches to modeling buildings by incorporating information in a new and advantageous manner.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for constructing a three-dimensional model of a building using a plurality of two-dimensional photographic images in an image database and a building lot database, the method comprising:
   identifying, by one or more computing devices, a first photographic image of the building from the image database, the first photographic image taken from a first perspective specified by a first set of camera parameters;
   identifying, by the one or more computing devices, a second photographic image of the building from the image database, the second photographic image taken from a second perspective specified by a second set of camera parameters, the second perspective different from the first perspective;
   identifying, by the one or more computing devices, an obstructed view of at least a portion of the building in the first or second photographic images;
   identifying, by the one or more computing devices, a third photographic image of the building from the image database, the third photographic image taken from a third perspective specified by a third set of camera parameters, wherein the third photographic image is chosen from the Image database such that the third photographic image provides an unobstructed view of the at least a portion of the building that is obstructed in the first or second photographic image: and
   determining, by the one or more computing devices, a first feature in the first photographic image corresponding to at least a portion of a roof of the building;
   determining, by the one or more computing devices, a second feature in the second photographic image corresponding to at least a portion of the roof of the building;
   determining, by the one or more computing devices, a third feature in the third photographic image corresponding to at least a portion of the roof of the building;
   determining, by the one or more computing devices, a height of the building based on the positions of first, second, and third features within the first, second, and third photographic images respectively, and the first, second, and third sets of camera parameters;
   determining, by the one or more computing devices, an identity of the building using reverse geocoding based at least in part on the first and second set of camera parameters;
   accessing, by the one or more computing devices, predetermined legal boundaries from the building lot database based at least in part on the determined identity of the building, the legal boundaries defining a lot associated with the building;
   constructing, by the one or more computing devices, a three-dimensional model of the building based on the height and the legal boundaries, wherein the legal boundaries specify, at least in part, a perimeter of the model and the height of the building specifies, at least in part, a height of the model; and
   improving, by the one or more computing devices, the three-dimensional model based on information provided by the third photographic image and the third set of camera parameters by modeling aspects of the building that are obstructed in the first photographic image and the second photographic image.

2. The method of claim 1, wherein the second photographic image is chosen from the image database with a second perspective wherein the first feature and second feature correspond to the same portion of the roof of the building.

3. The method of claim 1, wherein the three-dimensional model is created using photogrammetry, wherein the first photographic image and the second photographic image are treated as binocular views of the same building.

4. The method of claim 1, wherein one or both of the first photographic image and the second photographic image are aerial photographs or satellite photographs.

5. The method of claim 1, further comprising receiving, by the one or more computing devices, information about the building using remote sensing techniques, and incorporating the information derived from the remote sensing into constructing the three-dimensional model.

6. The method of claim 1, wherein the legal boundaries define the lot by providing one or more of: corners of the lot, edges of the lot, or dimensions of the lot.

7. The method of claim 1, further comprising:
   identifying, by the one or more computing devices, a plurality of buildings in a physical region; and
   repeating, by the one or more computing devices, the identifying a first photographic image, identifying a second photographic image, determining a first feature, determining a second feature, determining a height, identifying legal boundaries, and constructing a three-dimensional model for each of the plurality of buildings in the physical region, such the method constructs a three-dimensional model of the plurality of buildings in the physical region.

8. A system for constructing a three-dimension model of a building using a plurality of two-dimensional photographic images and a building lot database, the system comprising:
one or more memory devices;
one or more processors;
an image database, comprising a plurality of photographic images, each taken from a perspective specified by a set of camera parameters;
a building lot database, comprising a plurality of buildings, each associated with legal boundaries;
a building selection module, configured to receive a selection of a building from the building lot database for which a three-dimensional model is to be constructed;
a photographic image identification module, configured to:
identify a first photographic image of the building from the image database, the first photographic image taken from a first perspective specified by a first set of camera parameters,
identify a second photographic image of the building from the image database, the second photographic image taken from a second perspective specified by a second set of camera parameters, the second perspective different from the first perspective, and
identify a third photographic image of the building from the image database when the first or second photographic images depict an obstructed view of at least a portion of the building, the third photographic image taken from a third perspective specified by a third set of camera parameters, the third photographic image depicting a clear view of the at least a portion of the building that is obstructed in the first or second photographic images;
a height determination module, configured to:
determine a first feature in the first photographic image corresponding to at least a portion of a roof of the building;
determine a second feature in the second photographic image corresponding to at least a portion of the roof of the building;
determine a third feature in the third photographic image corresponding to at least a portion of the roof of the building;
determine a height of the building based on the positions of first, second, and third features within the first, second, and third photographic images respectively, and the first, second, and third sets of camera parameters;
a boundary identification module, configured to identify predetermined legal boundaries in the building lot database that define a lot associated with the building, the legal boundaries being identified based at least in part on an identity of the building determined using reverse geocoding based at least in part on the first and second set of camera parameters;
a three-dimensional modeling module, configured to construct a three-dimensional model of the building based on the height and the legal boundaries, wherein the legal boundaries specify, at least in part, a perimeter of the model and the height of the building specifies, at least in part, a height of the model; and
improve the three-dimensional model based on information provided by the third photographic image and the third set of camera parameters by modeling aspects of the building that are obstructed in the first photographic image and the second photographic image.

9. The system of claim 8, wherein the second photographic image is chosen from the image database with a second perspective wherein the first feature and second feature correspond to the same portion of the roof of the building.

10. The system of claim 8, wherein the three-dimensional model is created using photogrammetry, wherein the first photographic image and the second photographic image are treated as binocular views of the same building.

11. The system of claim 8, wherein one or both of the first photographic image and the second photographic image are aerial photographs or satellite photographs.

12. The system of claim 8, the three-dimensional modeling module is further configured to receive information about the building using remote sensing techniques, and to incorporate the information derived from the remote sensing into constructing the three-dimensional model.

13. The system of claim 8, wherein the legal boundaries define the lot by providing one or more of: corners of the lot, edges of the lot, or dimensions of the lot.

14. The system of claim 8, further comprising:
a regional building identifier, configured to:
identify a plurality of buildings in a physical region; and
wherein the image database, the building lot database, the building selection module, the photographic image identification module, the height determination module, the boundary identification module, and the three-dimensional modeling module are further configured to repeat the identifying a first photographic image, identifying a second photographic image, determining a first feature, determining a second feature, determining a height, identifying legal boundaries, and constructing a three-dimensional model for each of the plurality of buildings in the physical region identified by the regional building identifier, such the system is configured to construct a three-dimensional model of the buildings in the physical region.

15. One or more tangible, non-transitory computer-readable media storing computer-readable instructions that when executed by one or more processing devices cause the one or more processing devices to perform operations, the operation comprising:
identifying a first photographic image of a building from the image database, the first photographic image taken from a first perspective specified by a first set of camera parameters;
identifying a second photographic image of the building from the image database, the second photographic image taken from a second perspective specified by a second set of camera parameters, the second perspective different from the first perspective;
identifying an obstructed view of at least a portion of the building in the first or second photographic images;
identifying a third photographic image of the building from the image database, the third photographic image taken from a third perspective specified by a third set of camera parameters, wherein the third photographic image is chosen from the image database such that the third photographic image provides an unobstructed view of the at least a portion of the building that is obstructed in the first or second photographic image;
determining a first feature in the first photographic image corresponding to at least a portion of a roof of the building;

determining a second feature in the second photographic image corresponding to at least a portion of the roof of the building;
determining a third feature in the third photographic image corresponding to at least a portion of the roof of the building;
determining a height of the building based on the positions of first, second, and third features within the first, second, and third photographic images respectively, and the first, second, and third sets of camera parameters;
determining an identity of the building using reverse geocoding based at least in part, on the first and second set of camera parameters;
accessing predetermined legal boundaries that define a lot associated with the building in the building lot database based at least in part on the determined identity of the building;
constructing a three-dimensional model of the building based on the height and the legal boundaries, wherein the legal boundaries specify, at least in part, a perimeter of the model and the height of the building specifies, at least in part, a height of the model; and
improving the three-dimensional model based on information provided by the third photographic image and the third set of camera parameters by modeling aspects of the building that are obstructed in the first photographic image and the second photographic image.

* * * * *